(12) United States Patent
Bhat et al.

(10) Patent No.: US 9,432,871 B2
(45) Date of Patent: Aug. 30, 2016

(54) SYSTEM AND METHOD FOR MONITORING AND MAINTAINING A WIRELESS DEVICE

(71) Applicant: Good Technology Software, Inc., Wilmington, DE (US)

(72) Inventors: Sathyanarayana Pattavayal Bhat, Sunnyvale, CA (US); Vinay Shashikumar Badami, San Jose, CA (US); Benson Wei-Ming Tse, Santa Clara, CA (US)

(73) Assignee: Good Technology Corporation, Sunnyvale, CA (US)

( * ) Notice: Subject to any disclaimer, the term of this patent is extended or adjusted under 35 U.S.C. 154(b) by 0 days.

(21) Appl. No.: 14/472,229

(22) Filed: Aug. 28, 2014

(65) Prior Publication Data

US 2014/0370860 A1 Dec. 18, 2014

Related U.S. Application Data

(63) Continuation of application No. 13/728,625, filed on Dec. 27, 2012, now Pat. No. 8,849,257, which is a continuation of application No. 13/113,478, filed on May 23, 2011, now Pat. No. 8,351,908, which is a continuation of application No. 11/145,391, filed on Jun. 3, 2005, now Pat. No. 7,970,386.

(51) Int. Cl.
*H04W 8/22* (2009.01)
*H04W 24/10* (2009.01)
(Continued)

(52) U.S. Cl.
CPC ............. *H04W 24/10* (2013.01); *H04W 24/00* (2013.01); *H04W 24/02* (2013.01); *H04W 88/02* (2013.01); *H04W 4/00* (2013.01); *H04W 4/12* (2013.01)

(58) Field of Classification Search
CPC .... H04W 24/10; H04W 24/02; H04W 88/02
USPC ........ 455/63, 343, 418–420, 414.1; 701/201, 701/102; 713/156, 168, 173
See application file for complete search history.

(56) References Cited

U.S. PATENT DOCUMENTS

| 4,837,811 A | 6/1989 | Butler |
| 4,882,752 A | 11/1989 | Lindman |

(Continued)

FOREIGN PATENT DOCUMENTS

| CA | 2149337 | 6/1990 |
| EP | 0813133 | 12/1997 |

(Continued)

OTHER PUBLICATIONS

Altiris® Handheld Management Suite Datasheet Oct. 14, 2005.
(Continued)

*Primary Examiner* — Cong Tran
(74) *Attorney, Agent, or Firm* — Fish & Richardson P.C.

(57) ABSTRACT

A system is disclosed in which a wireless device is monitored and maintained over a network. One embodiment of the system comprises a wireless device including: a service to maintain data objects, provide messaging capability, and provide data access capability on behalf of a user of the wireless device; and a rules engine communicatively coupled to the service to execute a set of rules transmitted to the wireless device from a server, the set of rules to instruct the rules engine to gather information related to the wireless device and to take action on the wireless device based on the gathered information.

14 Claims, 5 Drawing Sheets

(51) Int. Cl.
*H04W 24/00* (2009.01)
*H04W 88/02* (2009.01)
*H04W 24/02* (2009.01)
*H04W 4/00* (2009.01)
*H04W 4/12* (2009.01)

(56) References Cited

U.S. PATENT DOCUMENTS

| | | | |
|---|---|---|---|
| 5,113,041 | A | 5/1992 | Blonder |
| 5,220,501 | A | 6/1993 | Lawlor |
| 5,237,614 | A | 8/1993 | Weiss |
| 5,432,999 | A | 7/1995 | Capps |
| 5,613,012 | A | 3/1997 | Hoffman |
| 5,631,947 | A | 5/1997 | Wittstein |
| 5,647,002 | A | 7/1997 | Brunson |
| 5,675,362 | A | 10/1997 | Clough |
| 5,687,322 | A | 11/1997 | Deaton |
| 5,727,202 | A | 3/1998 | Kucala |
| 5,745,884 | A | 4/1998 | Carnegie |
| 5,771,354 | A | 6/1998 | Crawford |
| 5,787,441 | A | 7/1998 | Beckhardt |
| 5,790,790 | A | 8/1998 | Smith |
| 5,857,201 | A | 1/1999 | Wright, Jr. |
| 5,862,325 | A | 1/1999 | Reed |
| 5,862,346 | A | 1/1999 | Kley |
| 5,903,881 | A | 5/1999 | Schrader |
| 5,928,329 | A | 7/1999 | Clark |
| 5,958,007 | A | 9/1999 | Lee |
| 5,987,609 | A | 11/1999 | Hasebe |
| 5,991,410 | A | 11/1999 | Albert |
| 5,999,947 | A | 12/1999 | Zollinger |
| 6,125,388 | A | 9/2000 | Reisman |
| 6,144,848 | A | 11/2000 | Walsh et al. |
| 6,317,793 | B1 | 11/2001 | Toyosawa |
| 6,330,568 | B1 | 12/2001 | Boothby |
| 6,489,671 | B2 | 12/2002 | Aoki |
| 6,496,875 | B2 | 12/2002 | Ramanujam |
| 6,796,491 | B2 * | 9/2004 | Nakajima ............... G06Q 20/04 235/379 |
| 6,813,487 | B1 | 11/2004 | Trommelen |
| 6,820,126 | B2 | 11/2004 | Sibecas et al. |
| 6,842,433 | B2 | 1/2005 | West et al. |
| 7,103,806 | B1 | 9/2006 | Horvitz |
| 7,218,941 | B1 | 5/2007 | Kubo et al. |
| 7,328,451 | B2 * | 2/2008 | Aaron ................. H04L 63/0209 713/154 |
| 7,480,907 | B1 | 1/2009 | Marolia |
| 7,496,957 | B2 | 2/2009 | Howard |
| 7,545,767 | B2 | 6/2009 | Zhao et al. |
| 7,606,560 | B2 | 10/2009 | Labrou et al. |
| 7,624,393 | B2 | 11/2009 | Egan |
| 7,698,702 | B2 | 4/2010 | Wetherly |
| 7,844,964 | B2 | 11/2010 | Marolia |
| 7,987,449 | B1 | 7/2011 | Marolia |
| 8,117,293 | B1 | 2/2012 | Anderson |
| 8,250,565 | B2 | 8/2012 | Marolia |
| 8,555,273 | B1 | 10/2013 | Chia et al. |
| 8,635,661 | B2 | 1/2014 | Shahbazi |
| 2002/0069037 | A1 | 6/2002 | Hendrickson et al. |
| 2002/0098840 | A1 | 7/2002 | Hanson |
| 2002/0143655 | A1 | 10/2002 | Elston et al. |
| 2003/0162555 | A1 | 8/2003 | Loveland |
| 2003/0194998 | A1 | 10/2003 | Bhide |
| 2004/0009751 | A1 | 1/2004 | Michaelis et al. |
| 2004/0009761 | A1 | 1/2004 | Money et al. |
| 2004/0034619 | A1 | 2/2004 | Lu et al. |
| 2004/0068721 | A1 | 4/2004 | O'Neill |
| 2004/0098715 | A1 | 5/2004 | Aghera |
| 2004/0121769 | A1 * | 6/2004 | Aoki ....................... H04W 8/04 455/435.1 |
| 2004/0153499 | A1 | 8/2004 | Heddaya et al. |
| 2004/0174264 | A1 | 9/2004 | Reisman et al. |
| 2004/0268147 | A1 | 12/2004 | Wiederin et al. |
| 2004/0268150 | A1 * | 12/2004 | Aaron ................. H04L 63/0209 726/11 |
| 2005/0003804 | A1 | 1/2005 | Huomo |
| 2005/0055578 | A1 * | 3/2005 | Wright .................... G06F 21/32 726/4 |
| 2005/0122930 | A1 | 6/2005 | Zhao et al. |
| 2005/0132358 | A1 | 6/2005 | Peev et al. |
| 2005/0149436 | A1 | 7/2005 | Elterich |
| 2005/0164704 | A1 | 7/2005 | Winsor |
| 2005/0206518 | A1 | 9/2005 | Welch et al. |
| 2005/0233776 | A1 | 10/2005 | Allen et al. |
| 2006/0015878 | A1 | 1/2006 | Ritter |
| 2006/0053368 | A1 | 3/2006 | Bosworth et al. |
| 2006/0101273 | A1 | 5/2006 | Tan et al. |
| 2006/0117073 | A1 | 6/2006 | Bosworth et al. |
| 2006/0147043 | A1 | 7/2006 | Mann et al. |
| 2006/0168095 | A1 | 7/2006 | Sharma et al. |
| 2006/0246878 | A1 | 11/2006 | Khoury |
| 2006/0265689 | A1 | 11/2006 | Kuznetsov et al. |
| 2007/0093243 | A1 | 4/2007 | Kapadekar |
| 2007/0190978 | A1 | 8/2007 | White et al. |
| 2008/0005576 | A1 | 1/2008 | Weiss |

FOREIGN PATENT DOCUMENTS

| | | |
|---|---|---|
| JP | H06-332858 A | 2/1994 |
| JP | H08-137732 A | 5/1996 |
| JP | H09-081560 A | 3/1997 |
| JP | 11-265279 H | 9/1999 |
| JP | 2000-305757 A | 11/2000 |
| JP | 2002-304263 A | 10/2002 |
| JP | 2003005905 A | 10/2003 |
| JP | 2005115829 | 4/2005 |
| WO | 2004021114 A2 | 3/2004 |

OTHER PUBLICATIONS

Altiris® Inventory Solution 6.1 for Pocket PC Product Guide.
Altiris® Inventory Solution 6.1 for RIM Product Guide.
Altiris® Security Solution 6.1 for Handhelds Administrator Guide.
Altiris® Security Solution 6.1 for Handhelds User Guide.
Release Notes Altiris Pocket Pc Agent 6.1 Service Pack 1.
Microsoft Systems Management Server SMS 2003 Device Management Feature Pack Guide.
Microsoft Systems Management Server 2003 with Device Management Feature Pack SC02 SMS 2003 Device Management Feature Pack.
Operations Guide: Microsoft Systems Management Server 2003.
Microsoft Systems Management Server 2003 with Device Management Feature Pack Concepts, Planning, and Deployment Guide.
User's Guide: Hewlett Packard iPAQhx2000 Series Pocket PC 2004.
Introducing Tivoli Distributed Monitoring Workbench 4.1 (Feb. 2002).
Tivoli Distributed Monitoring (Advanced Edition) 4.1—Early Experiences (Dec. 2001).
All About Tivoli Configuration Manager Version 4.2 (Dec. 2002).
PDA Management with IBM Tivoli Configuration Manager (May 2003).
Unicenter TNG Asset Management Option Administrator Guide.
Unicenter TNG Asset Management Option Getting Started.
Computer Associates Unicenter TNG Asset Management Option 3.1 Provices Complete Server-to-PDA Inventory.
Combining Location and Data Management in an Environment for Total Mobility Feb. 1996.
DARPA Open Object-Oriented DatabasePreliminary Module Specification, Change Management Module Nov. 25, 1991.
How Not to Save Cached Internet Files with Roaming User Profiles Dec. 5, 2003.
Roam: A Scalable Replication System for Mobile and Distributed Computing Jan. 1998.
David H. Ratner, Selective Replication—Fine-Grain Control of Replicated Files, Jan. 1995.
Windows History: Internet Explorer History Jun. 30, 2003.
Apple Newton 1995.
AT&T PocketNet Phone 1996.
Casio Zoomer Oct. 1993.

(56) References Cited

OTHER PUBLICATIONS

Concurrent Versioning Software (CVS) 1990.
IBM DataPropagator 1994.
IBM Simon 1994.
Infinite InterChange Apr. 1997.
Microsoft Internet Explorer 3.01 Oct. 1996.
Microsoft Windows NT 4.0 Jul. 1993.
Microsoft Windows XP Aug. 2001.
Motorola Envoy Apr. 10, 1995.
Motorola Marco Apr. 10, 1995.
Nokia 9000 Communicator 1995.
Nokia 9000i Communicator Aug. 1996.
Pilot Organizer 1996.
Sharp Zaurus Dec. 15, 1994.
Sony Magic Link 1994.
XcelleNet RemoteWare 1996.
Casio Cassiopeia E-115 Pocket PC User's Guide 2000.
How to Install Microsoft Mobile Information Server 2002 Server Active Sync Dec. 17, 2002.
IBM Tivoli Configuration Manager 4.2 Aug. 2002.
Bitfone MVP Product and related software as described in U.S. Appl. No. 60/730,286 Oct. 25, 2005.
Computer Associates Unicenter TNGAsset Management Option 3.1 Jan. 2001.
PDA Defense Enterprise Version 2 2002.
zTrace zSecurity Suite Jun. 13, 2002.
Ed Simon, Paul Madsen, Carlisle Adams, "An Introduction to XML Digital Signatures," O'Reilly xml.com (Aug. 8, 2001), http://www.xml.com/pub/a/2001/08/08/xmldsig.html.
International Search Report issued Jul. 7, 2008 on corresponding International application PCT/US2006/021297, filed Jun. 1, 2006.
International Preliminary Report on Patentability issued Aug. 12, 2008 on corresponding International application PCT/US2006/021297, filed Jun. 1, 2006.
RFC 2616, Hypertext Transfer Protocol—HTTP/1.1 at §§ 3.2.2, 9.3,9.5 (1999).
IBM Tivoli Monitoring Workbench Feb. 2002.

\* cited by examiner

SYSTEM AND METHOD FOR MONITORING AND MAINTAINING A WIRELESS DEVICE

CROSS-REFERENCE TO RELATED APPLICATIONS

This application is a continuation of U.S. patent application Ser. No. 13/728,625, filed Dec. 27, 2012, which is a continuation of U.S. patent application Ser. No. 13/113,478, filed May 23, 2011, now U.S. Pat. No. 8,351,908, which is a continuation of U.S. patent application Ser. No. 11/145,391, filed Jun. 3, 2005, now U.S. Pat. No. 7,970,386, the disclosures of which are incorporated by reference herein in their entirety.

BACKGROUND OF THE INVENTION

1. Field of the Invention

This invention relates generally to the field of network data services. More particularly, the invention relates to an apparatus and method for monitoring and maintaining a wireless device.

2. Description of the Related Art

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Mobile platforms included on the wireless data processing devices run mission-critical applications. As such, it is important to gather information about applications running on the device, protect the data on the device, and protect the applications on the device. Furthermore, there may be requirements that certain prerequisite applications be present or absent on the mobile platform to enforce an organization's policies, to secure the mobile platform, or to permit' auditing procedures.

Presently, some applications operate to scan a device and remove certain files according to criteria contained in the application. For example, a virus scanner operates in such a way. However, virus scanners only scan for known objects on the device, and not for the absence of certain objects. Furthermore, virus scanners only check for the existence of viruses, and not for generic things such as battery strength or device peripheral functionality.

Also, because the virus scanner application resides on the device on which it operates, it cannot check itself to ensure that it is running properly. Furthermore, virus scanners only accept rules from the vendor of the application, and do not have the functionality to allow organizations other than the vendor to generate and enforce rules to fit the organization's corporate policy.

Currently, existing products or technology in the market do not gather device information and enforce the existence or non-existence of applications on the device. Accordingly, what is needed is a system and method for monitoring and maintaining a wireless device. What is also needed is a network infrastructure to support remote monitoring and maintenance of a wireless device.

SUMMARY OF THE INVENTION

A system is disclosed in which a data processing device is monitored and maintained over a network. One embodiment of the system comprises a wireless device including: a service to maintain data objects, provide messaging capability, and provide data access capability on behalf of a user of the wireless device; and a rules engine communicatively coupled to the service to execute a set of rules transmitted to the wireless device from a server, the set of rules to instruct the rules engine to gather information related to the wireless device and to take action on the wireless device based on the gathered information.

In another embodiment, a system is disclosed comprising a server communicatively coupled to a network, and an administrator coupled to the server configured to provide a set of rules to a wireless device, the set of rules to instruct the wireless device to gather information related to the wireless device and take action based on the gathered information.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
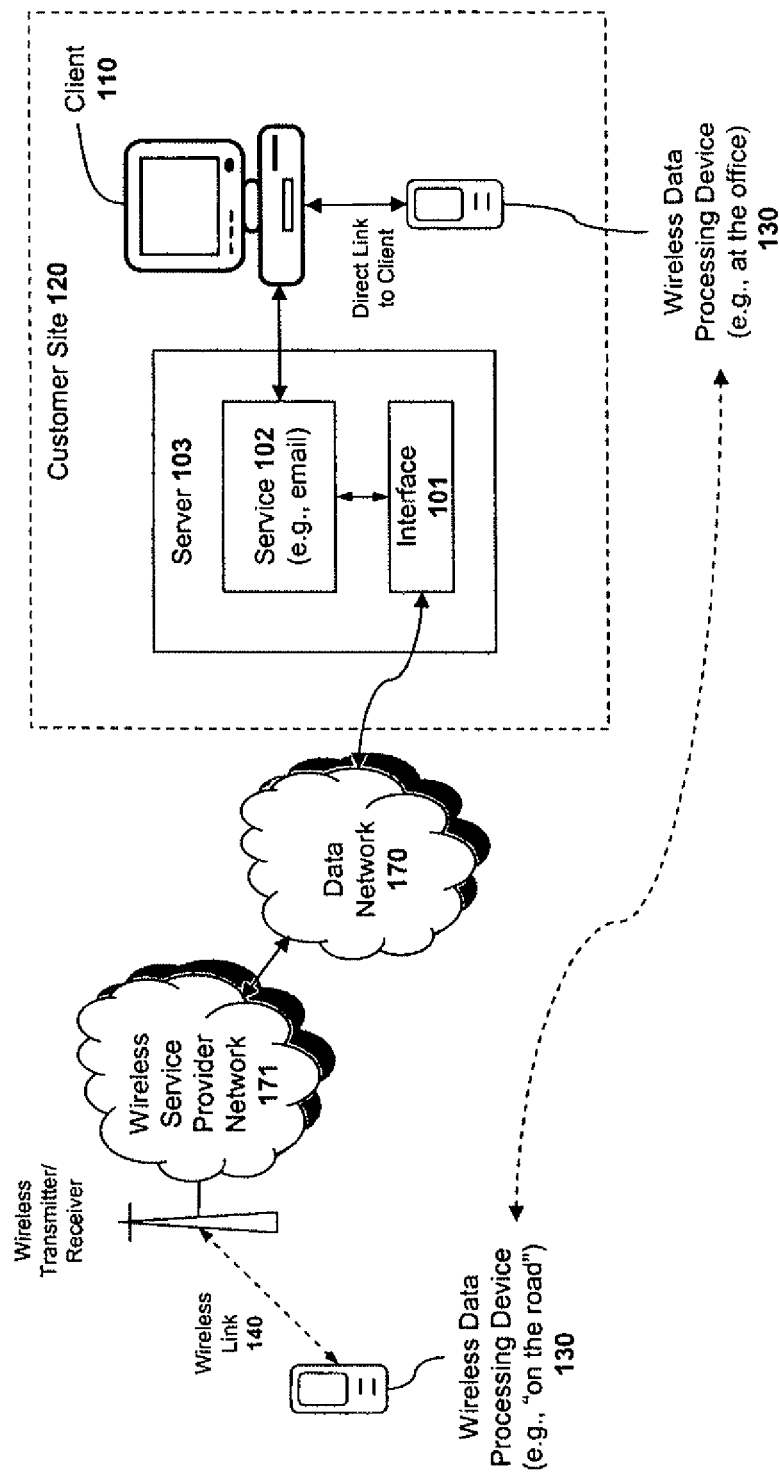
FIG. 1 illustrates an exemplary network architecture used to implement embodiments of the present invention.

FIG. 1 illustrates one embodiment of a network architecture for implementing the techniques described herein. The "customer site" 120 illustrated in FIG. 1 may be any local-area or wide-area network over which a plurality of servers 103 and clients 110 communicate. For example, the customer site may include all servers and clients maintained by a single corporation. The servers 103 may be configured to provide a variety of different messaging and groupware services 102 to network users (e.g., e-mail, instant messaging, calendaring, . . . etc.). In one embodiment, these services are provided by Microsoft Exchange™. However, the underlying principles of the invention are not limited to any particular messaging/groupware platform.

In one embodiment of the invention, an interface 101 forwards data objects maintained by the service 102 (e.g., e-mail messages, instant messages, calendar data, . . . etc.) to a plurality of wireless data processing devices (represented in FIG. 1 by wireless device 130) via an external data network 170 and/or a wireless service provider network 171. For example, if the service 102 includes an e-mail database, the interface 101 transmits any new e-mails which arrive in a user's mailbox on the service 102 to the user's wireless data processing device 130 (over the network(s) 170 and/or 171).

Alternatively, or in addition, the service 102 may provide the e-mail to the user's local computer (e.g., client 110) upon request (i.e., so that the user will receive the e-mail on his/her wireless device 130 when out of the office and on his/her personal computer 110 when in the office). Conversely, e-mail messages sent from the user's wireless data processing device 130 are transmitted to the service 102 via the interface 101.

In one embodiment, the interface 101 is a software module adapted to work with the particular service 120. It should be noted, however, that the interface 101 may be implemented in hardware or any combination of hardware and software while still complying with the underlying principles of the invention.

In one embodiment, the external data network 170 is comprised of a plurality of servers/clients (not shown) and other networking hardware (e.g., routers, hubs, . . . etc.) for transmitting data between the interface 101 and the wireless devices 130. In one embodiment, the interface 101 encapsulates data in one or more packets containing an address identifying the wireless devices 130 (e.g., such as a 24-bit Mobitex Access Number ("MAN #")). The external data network 170 transmits the packets to a wireless service provider network 171 which, in turn, transmits the packets (or the data contained therein) over a wireless communication link to the wireless device 130. In one embodiment, the wireless service provider network is a 2-way paging network. However, various other network types may be employed (e.g., CDMA 2000, PCS, . . . etc.) while still complying with the underlying principles of the invention.

It should be noted that the network service provider network 171 and the external data network 170 (and associated interface 101) may be owned/operated by the same organization or, alternatively, the owner/operator of the external data network 170 may lease wireless services from the wireless service provider network. The underlying principles of the invention are not limited to any particular service arrangement.

In one embodiment of the invention, the service 102 (e.g., the e-mail database) is fully synchronized with the wireless data processing device 130. Thus, any actions performed on the wireless device 130 are automatically updated on the service 102 and any transactions occurring at the service 102 are automatically reflected on the device 130. Synchronization updates of this type may include but are not limited to device configuration modifications, calendar updates, e-mail message updates, instant messages, to-do list updates and/or any other type of personal information management transactions or corporate data management transactions (hereinafter "message transactions").

As one example, when a user views an e-mail message using the device 130, an indication that the user viewed the message is transmitted to the service 102 (via the interface 101). Accordingly, if the user subsequently connects to e-mail via a client 110, the e-mail will appear as having already been viewed. Other actions such as message deletions, filing activities (e.g., moving a message to a particular folder), message responses, meeting confirmations/additions . . . etc., will automatically be reflected in the service 102, thereby providing complete synchronization between the service 102, the device 130 and/or the client 110 (if one is being used).

Current systems do not offer organizational control over monitoring their wireless devices for various criteria, and maintaining the wireless devices based on the monitoring. As such, these systems cannot gather device information and enforce organizational policies on the wireless devices. One reason for this is that prior systems do not monitor the entire wireless device unit remotely, and any monitoring is not done based on organizational policies. As such, in order for an organization to monitor and maintain its wireless devices, embodiments of the invention employ one or more of the following techniques.

An Exemplary Wireless Device Monitor

Figure 2:
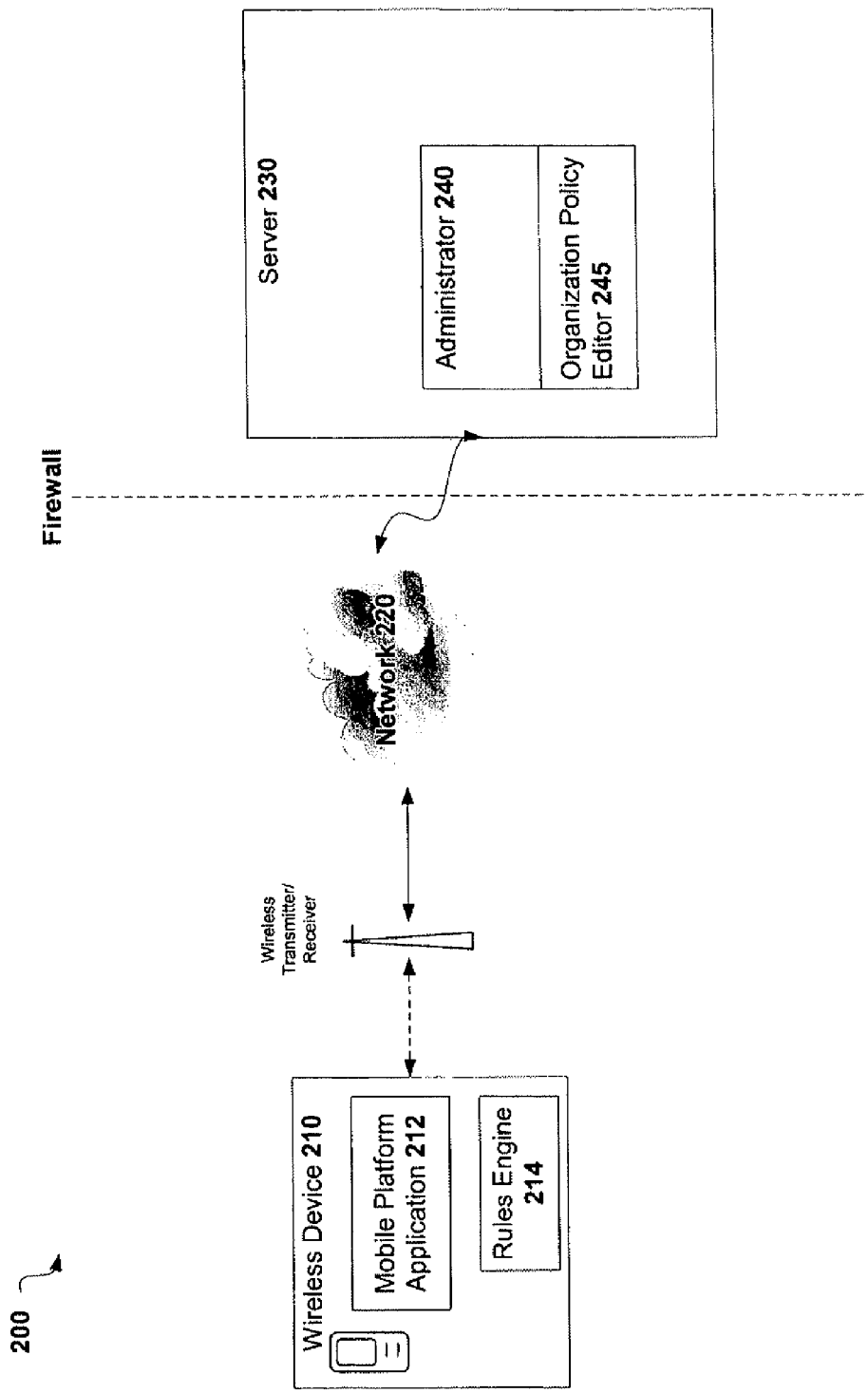
FIG. 2 illustrates one embodiment of a network architecture used to implement an application checker.

FIG. 2 is a block diagram illustrating one embodiment of a system 200 to monitor and maintain a wireless device. System 200 includes a wireless device 210, a network 220, and a server 230. In one embodiment, system 200 may be implemented as system 100 of FIG. 1. Network 220 may be the same as data network 170 and wireless service provider network 171, individually and/or in combination. Also, a firewall may be utilized between the network 220 and server 230. System 200 may be used to implement monitoring and maintenance of the wireless device 210.

Wireless device 210 further includes a mobile platform application 212 and a rules engine 214. In one embodiment, the application 212 provides wireless messaging and data access for the wireless device 210 in connection with a main server, such as server 230. Server 230 may be maintained by an organization that owns and operates the wireless device 210. In one embodiment, application 212 operates as a service to maintain data objects on behalf of a user of the wireless device 210. Application 212 may also provide real-time synchronization of the wireless device 210 with server 230. In one embodiment, application 212 is a software module adapted to work with server 230.

In one embodiment, application 212 receives a rule definition file sent to the wireless device 210 through a wireless or wired medium. This rule definition file may be created by an organization owning the wireless device, and sent to the wireless device 210 by way of server 230, which may be operated by the organization. The rule definition file embodies a set of rules to be applied to the wireless device. In one embodiment, application 212 transfers the rule definition file to rules engine 214 for analysis and execution.

The rules engine 214 of the wireless device 210 stores and executes the rule definition file. In one embodiment, the rules engine 214 operates to verify authenticity of any rule definition files it receives. This verification may be accomplished by determining the origination of the rule definition file and cross-referencing the origination with a list of allowable entities.

Based on the rule definition file, the rules engine 214 monitors the wireless device 210 by gathering information relating to the wireless device 210, and checking information associated with one or more applications on the wireless device 210. Wireless device information that the rules engine 214 may gather includes, but is not limited to, applications installed on the device, applications not installed on the device, and functionally operative features within applications installed on the device. Furthermore, the information gathered may include device characteristics such as OS version, ROM version, application licensing restrictions and their expiry, code signature and certification validation of applications, application usage patterns, device hardware characteristics, device operating characteristics, peripherals on the device, and SMS functionality.

In one embodiment, the rules engine 214 may also take action based on the results from monitoring of the wireless device 210 by way of the rule definition file. Such actions may include, but are not limited to, warning the device user, locking the device, phoning a set of numbers, initiating software downloads and upgrades, alerting the corporate network monitors, shutting down applications, shutting down the device, and erasing critical data on the device. Furthermore, the rules engine may take action and enforce device system characteristics based on corporate policies promulgated by an organization owning the wireless device 210.

In one embodiment, rules engine 214 is a software module adapted to work with application 212. It should be noted, however, that the rules engine 214 may be implemented in hardware or any combination of hardware and software while still complying with the underlying principles of the invention.

In one embodiment, server 230 may be configured to provide a variety of different messaging and groupware services to network users (e.g., e-mail, instant messaging, calendaring, . . . etc.) such as wireless device 210. In one embodiment, these services are provided by Microsoft Exchange™. In one embodiment, server 230 is the same as server 103 of FIG. 1. In another embodiment, server 230 may be a synchronization server such as GoodLink™ server of Good Technology, Inc. of Santa Clara, Calif.

Server 230 further includes an administrator 240 and an organization policy editor 245 as part of the administrator 240. The administrator 240 is responsible for assembling and transmitting the rule definition file to the wireless device 210. In one embodiment, the rule definition file is any set of rules to be applied to the wireless device 210. The rule definition file may be an Extensible Markup Language (XML) file, native script, executable module, or a pointer (URL) to another resource of the rule definition file. In one embodiment, any changes or updates made to the rule file may be incrementally synchronized with the wireless device.

In one embodiment, the corporate policy editor 245 is responsible for transforming corporate policies for the wireless device 210 into the set of rules for the rule definition file. Some examples of corporate policies include, but are not limited to, allowing or not allowing certain applications to exist on the wireless device, maintaining particular settings within applications, ensuring certain versions of applications are up-to-date, and preventing certain peripherals from being associated with the wireless device. One skilled in the art will appreciate that a variety of corporate policies may be implemented to monitor and maintain the wireless device 210.

In one embodiment, administrator 240 is a software module adapted to work with server 230. It should be noted, however, that the administrator 240 may be implemented in hardware or any combination of hardware and software while still complying with the underlying principles of the invention.

Figure 3:
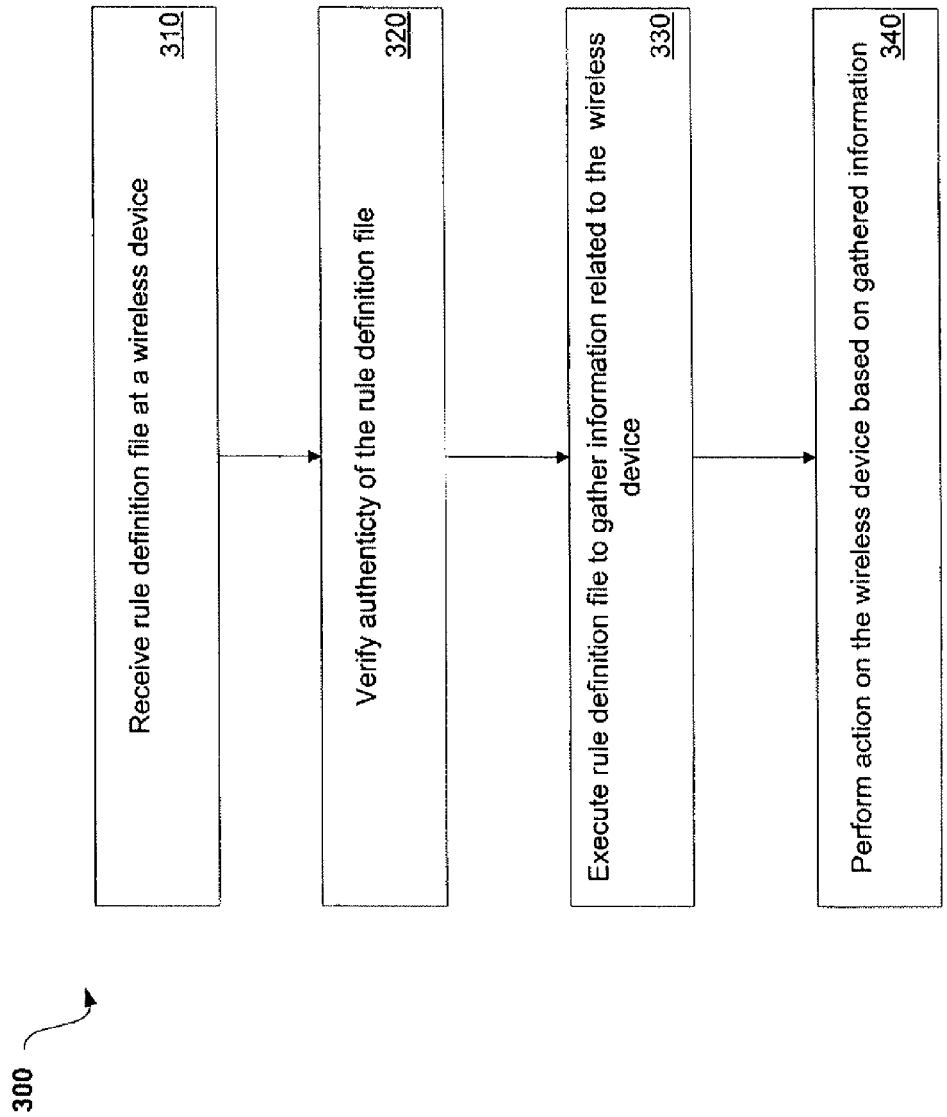
FIG. 3 is a flow diagram depicting one embodiment of a method of the present invention.

FIG. 3 is a flow diagram of one embodiment of a method 300 to monitor and maintain a wireless device. Method 300 may be implemented in a system such as that described with respect to FIG. 2. At processing block 310, a rule definition file is received at the wireless device 210. In one embodiment, the mobile platform application 212 receives the file and routes it to the rules engine 214. At processing block 320, the rules engine 214 verifies the authenticity of the rule definition file.

Then, at processing block 330, the rules engine executes the rule definition file. Upon execution of the file, the rules engine 214 may gather information related to the wireless device. The information gathered may include, but is not limited to, applications installed on the device, applications not installed on the device, functionally operative features within applications installed on the device, and battery status. Furthermore, the information gathered may include device characteristics such as OS version, ROM version, application licensing restrictions and their expiry, code signature and certification validation of applications, application usage patterns, device hardware characteristics, device operating characteristics, peripherals on the device, and SMS functionality.

Finally, at processing block 340 the rules engine 214 performs an action based on the execution of the rule definition file. Such an action may include, but is not limited to, warning the device user, locking the device, phoning a set of numbers, initiating software downloads and upgrades, alerting the corporate network monitors, shutting down applications, shutting down the device, and erasing critical data on the device.

Figure 4:
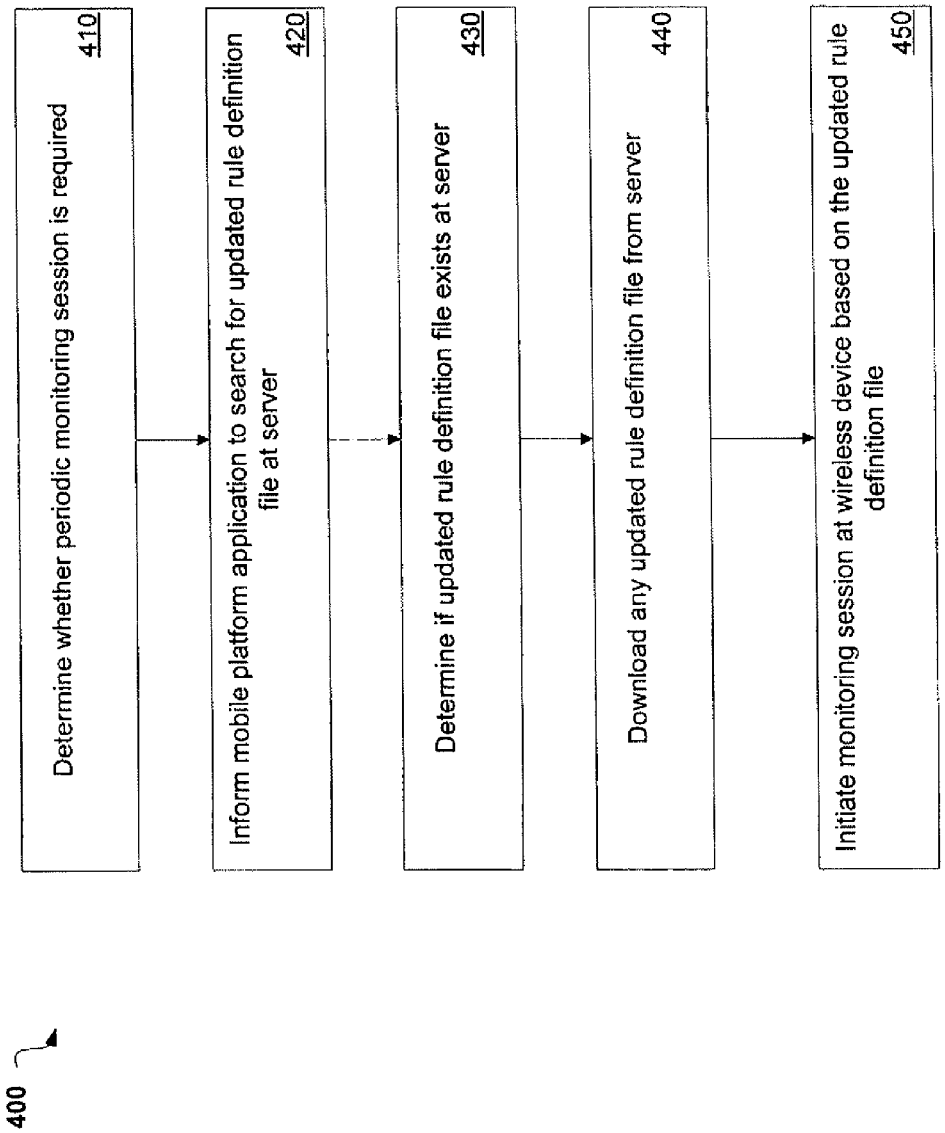
FIG. 4 is a flow diagram depicting another embodiment of a method of the present invention.

FIG. 4 is a flow diagram of one embodiment of a method 400 to receive a rule definition file at the rules engine 214. At processing block 410, the rules engine 214 determines whether a periodic monitoring session of the wireless device 210 is required. The monitoring session may be the same process as described with respect to FIG. 3. In one embodiment, such a periodic monitoring session may occur at various time intervals including, upon start-up of the wireless device, once a day, once a week, and upon installation of any components or applications on the wireless device. One skilled in the art will appreciate that a variety of monitoring time intervals may be implemented by the rules engine 214.

If a periodic monitoring session is required, then at processing block 420 the rules engine 214 informs the mobile platform application 212 of the wireless device 210 to check for an update with server 230. At processing block 430, the application 212 connects to the server 230 to determine if an updated rule definition file exists. In some embodiments, the application 212 or server 230 may compare the rule definition file already on the wireless device 210 with the most recent rule definition file on the server 230.

If a more recent rule definition file exists on the server 230, then at processing block 440 the updated file is downloaded to the wireless device 210. At processing block 450, the monitoring session is initiated. In one embodiment, the monitoring session is the same process as described with respect to FIG. 3.

Figure 5:
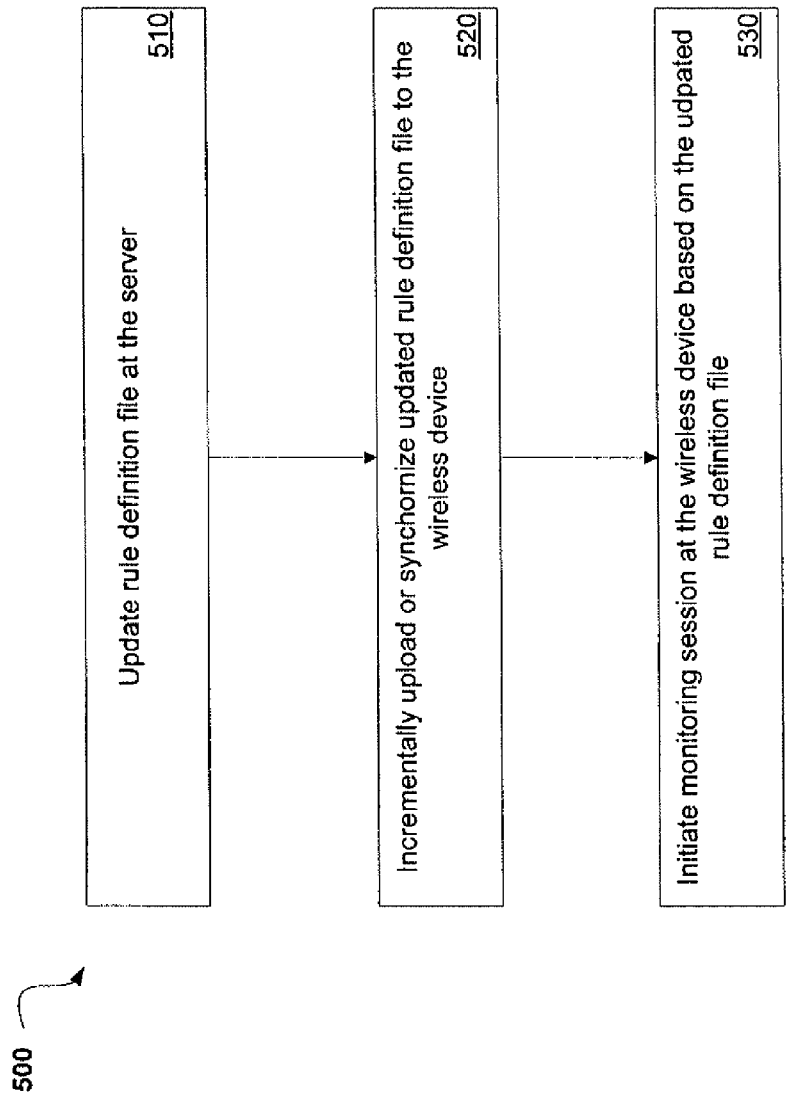
FIG. 5 is a flow diagram depicting a further embodiment of a method of the present invention.

FIG. 5 is a flow diagram of another embodiment of a method 500 to receive a rule definition file at a rules engine. In some embodiments, in lieu of the wireless device 210 determining whether an updated rule definition file exists, the server 230 may automatically synchronize any updated rule definition file with the wireless device's 210 file. The following description illustrates this process.

At processing block 510, the server 230 updates the rule definition file stored on the server 230. Then, at processing block 520, the server incrementally synchronizes changes to the file with the wireless device 210. Such synchronization may occur over a wired or wireless medium. Finally, at processing block 530, the rules engine 214 initiates a monitoring session according to the new rule definition file received from the server 230. In some embodiments, the rules engine 214 may initiate the monitoring session when it receives an updated file, and/or it may initiate monitoring session on a periodic basis, according to some of the example time intervals mentioned previously.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, Flash memory, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while illustrated as an interface 101 to a service 102 executed on a server 103 (see FIG. 1), it will be appreciated that the underlying principles of the invention may be implemented on a single client in which the client transmits data over a network. Moreover, although described in the context of a wireless data processing device, the underlying principles of the invention may be implemented to compress data in virtually any networking environment, both wired and wireless. Accordingly, the scope and spirit of the invention should be judged in terms of the claims that follow.

What is claimed is:

1. A wireless device, comprising:
    a data store comprising executable software and a wireless device rule definition file;
    a processor in data communication with the data store, the processor configured to execute the software and cause the wireless device to:
        determine a monitoring interval for the wireless device;
        determine whether the wireless device rule definition file is to be updated during the monitoring interval;
        request rule definition update data if it is determined that wireless device rule definition file is to be updated;
        receive the rule definition update data;
        update the wireless device rule definition file based on the rule definition update data;
        gather information about the wireless device based on the updated wireless device rule definition file; and
        perform an action on the wireless device based on the gathered information,
        wherein the action is selected from the group consisting of: phoning a number from the wireless device, initiating a software download to the wireless device, initiating a software upgrade to the wireless device, shutting down an application on the wireless device, shutting down the wireless device, and erasing data on the wireless device.

2. The wireless device of claim 1, wherein the rule definition update data comprises an updated wireless device rule definition file.

3. The wireless device of claim 1, wherein the processor is further configured to cause the wireless device to:
    receive rule definition authenticity data; and
    verify the authenticity of the rule definition update data.

4. The wireless device of claim 1, wherein the processor is further configured to cause the wireless device to: initiate a monitoring session of the wireless device based on the updated wireless device rule definition file.

5. The wireless device of claim 1, wherein the monitoring interval relates to a mobile application on the wireless device.

6. A method of maintaining a wireless device, the method comprising:
    determining a monitoring interval for the wireless device;
    determining whether a wireless device rule definition file stored on the wireless device is to be updated during the monitoring interval;
    requesting rule definition update data if it is determined that wireless device rule definition file is to be updated;
    receiving the rule definition update data;
    updating the wireless device rule definition file based on the rule definition update data;
    gathering information about the wireless device based on the updated wireless device rule definition file; and
    performing an action on the wireless device based on the gathered information,
    wherein the action is selected from the group consisting of: phoning a number from the wireless device, initiating a software download to the wireless device, initiating a software upgrade to the wireless device, shutting down an application on the wireless device, shutting down the wireless device, and erasing data on the wireless device.

7. The method of claim 6, wherein the rule definition update data comprises an updated wireless device rule definition file.

8. The method of claim 6, further comprising:
    receiving rule definition authenticity data; and
    verifying the authenticity of the rule definition update data.

9. The method of claim 6, further comprising: initiating a monitoring session of the wireless device based on the updated wireless device rule definition file.

10. The method of claim 6, wherein the monitoring interval relates to a mobile application on the wireless device.

11. A non-transitory, computer-readable medium comprising computer-executable instructions that, when executed by a processor, cause a wireless device to perform a method of maintaining the wireless device, the method comprising:
    determining a monitoring interval for the wireless device;
    determining whether a wireless device rule definition file stored on the wireless device is to be updated during the monitoring interval;
    requesting rule definition update data if it is determined that wireless device rule definition file is to be updated;
    receiving the rule definition update data;
    updating the wireless device rule definition file based on the rule definition update data;
    gathering information about the wireless device based on the updated wireless device rule definition file; and
    performing an action on the wireless device based on the gathered information,
    wherein the action is selected from the group consisting of: phoning a number from the wireless device, initiating a software download to the wireless device, initiating a software upgrade to the wireless device, shutting down an application on the wireless device, shutting down the wireless device, and erasing data on the wireless device.

12. The non-transitory, computer-readable medium of claim 11, wherein the rule definition update data comprises an updated wireless device rule definition file.

13. The non-transitory, computer-readable medium of claim 11, wherein the method further comprises:
   receiving rule definition authenticity data; and
   verifying the authenticity of the rule definition update data.

14. The non-transitory, computer-readable medium of claim 11, wherein the method further comprises: initiating a monitoring session of the wireless device based on the updated wireless device rule definition file.

* * * * *